United States Patent [19]

Lowry

[11] Patent Number: 5,946,002
[45] Date of Patent: Aug. 31, 1999

[54] METHOD AND SYSTEM FOR IMAGE ANIMATION

[75] Inventor: Lee E. Lowry, Provo, Utah

[73] Assignee: Novell, Inc., Provo, Utah

[21] Appl. No.: 08/801,912

[22] Filed: Feb. 14, 1997

[51] Int. Cl.⁶ .................................................. G06F 3/100
[52] U.S. Cl. ............................................ 345/474; 345/473
[58] Field of Search .................................. 345/474, 342, 345/473, 475, 340, 343

[56] References Cited

U.S. PATENT DOCUMENTS

| | | | |
|---|---|---|---|
| 5,347,628 | 9/1994 | Brewer et al. | 395/159 |
| 5,479,602 | 12/1995 | Baecker et al. | 395/159 |
| 5,734,805 | 3/1998 | Isensee et al. | 345/474 X |
| 5,751,283 | 5/1998 | Smith | 345/342 |
| 5,760,772 | 6/1998 | Austin | 345/342 |

OTHER PUBLICATIONS

Borland C++ 4.x Tips, Tricks. and Traps, pp. 77–90, 1994, Que Corporation.

*Primary Examiner*—Phu K. Nguyen
*Assistant Examiner*—Cliff N. Vo
*Attorney, Agent, or Firm*—Dinsmore & Shohl LLP

[57] ABSTRACT

An method for implementing animations which reduces the complexity associated with animations, creates a uniform mechanism for implementing an animation, and allows the repositioning and resizing of an animation within a parent window without software recompilation. Another embodiment includes an animation object which modularizes the methods required to implement an animation.

20 Claims, 2 Drawing Sheets

METHOD AND SYSTEM FOR IMAGE ANIMATION

FIELD OF THE INVENTION

This invention relates to computer-implemented animations, and particularly to a method and system for implementing such animations in a uniform way regardless of the type of graphical images used in the animation. The invention also simplifies the implementation of an animation, and allows repositioning of the animation within a parent window without recompilation of the source program.

BACKGROUND OF THE INVENTION

Animations are widely used in computer programs, and serve a variety of purposes. For example, an animation can be used to direct a user's attention to a certain area of a display, or to graphically illustrate that the computer is currently processing the user's request. An animation requires sequentially displaying several images at the same location on a display device. Each individual image varies slightly from the previous image, and when sequentially displayed the differences between the images result in an animation.

There are currently several problems with conventional animation techniques. An animation requires several discrete processes, including loading images, maintaining a timer interrupt, and displaying the images in the proper sequence. The functions to implement these processes and the calls to the functions are generally dispersed throughout the code, which can make the implementation as well as the debugging of an animation difficult.

Another problem with animations is that the code required to load and display the images differ depending on the type of graphical image that is used to implement the animation. For example, in the Microsoft Windows environment, one set of system functions are used to load and display icon images, and another set of system functions are used to load and display bitmap (BMP) images. Thus, the developer must always be conscious of the type of image which is being used to implement an animation, and be familiar with the different functions required to process each type of image.

Animations are frequently used to inform a user that the computer is busy processing a request, and cannot currently accept additional requests. Such processes sometimes allow the user to select a Pause or Stop button, to temporarily or permanently stop the process. When the Stop button is activated to stop the process, the animation is also usually stopped, or paused, and the last displayed image in the animation sequence remains displayed on the screen. Some images in an animation may be more aesthetically pleasing than others, and in such a pause situation, it is desirable to pause the animation on an aesthetically pleasing image, or to provide an entirely new image which graphically illustrates the pause. Conventional animation techniques do not easily allow the temporary loading of a particular image to be displayed during a pause situation.

When marketing software internationally, animation can cause other problems. Dialog boxes and other windows typically must have the displayed text translated into the language of the country in which the product is being sold. To ease this translation process, developers will frequently place such text into a data file, sometimes referred to as a resource file, the contents of which can be modified without having to modify and recompile the source software. A translator, sometimes referred to as a 'localizer' can then edit the resource file and translate the text strings in the resource file from one language to another. The resource file is then relinked with the executable program. When the program is executed, it reads the resource file, and displays the translated text. Since the text was extracted from a data file, it is not necessary to recompile the program. This translation process can, however, cause problems with animations. The translated text can require a greater amount of space than required by the original text, resulting in the translated text overlapping the space originally reserved for the animation. Conventional animation techniques require modifying the software to display the animation elsewhere in the parent window box, which is usually not within the skills of the localizer, and which increases the cost of preparing the software for release in the international market.

It is apparent that a method and system which eases the implementation of animations, which can be used to animate different types of graphical images, and which allows the location of the animation to be modified without requiring modification and recompilation of the software would be desirable.

SUMMARY OF THE INVENTION

It is one object of this invention to provide a method and system which allows the repositioning of an animation from one area in a window to another area in the window without recompilation.

It is another object of this invention to provide a method and system for easing the implementation of animations in a program.

It is another object of this invention to provide a method and system which achieves uniformity in implementing an animation regardless of the type of image used in the animation.

It is yet another object of this invention to provide a method and system for creating animations which allows the specification of a particular image to be displayed during a pause of the animation.

Additional objects, advantages and other novel features of the invention will be set forth in part in the description that follows, and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a method and system is provided for generating computer-implemented animations. The method includes creating an animation window within which the animation will occur. The dimensions and location of the animation window with respect to the parent window within which the animation window will be displayed are specified in an external file, such as a resource file. The dimensions and location are obtained from the resource file, and the animation window is created and displayed at the designated location. The images uses to implement the animation are then displayed in the animation window. The use of an external file to define the position and size of an animation window allows a localizer to change the size and location of the animation without recompiling the program. Thus, if text translated from one language to another requires additional space in the translated version, the size and location of an animation can easily be repositioned within the parent window if necessary.

According to another embodiment of this invention, an object-oriented method and system is provided for generating animations. An animation object is provided which achieves a modular mechanism for implementing animations, and consolidates into one object the various implementation processes, or methods, required to implement an animation, such as loading images, setting timer events, and generating and responding to paint events. The animation object includes a class method for adding images to the animation, regardless of the type of image, freeing a developer from being concerned with the various techniques required to load and paint different types of images. Any number of images can be added to the animation, and the developer need only provide to the animation object a reference where the animation can find each image. The animation object also takes care of converting the image into a proper format for display on a display device.

According to another embodiment of this invention, the animation object implements easy-to-use pause and resume class methods which handle the necessary steps to pause and resume on animation. The pause method accepts a reference to an image which will be used by the animation object to display in the animation window while the animation is paused. The pause and resume methods completely relieve the developer of the details required to carry out the pausing and resuming of the animation.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiments of the invention, examples of which are illustrated in the accompanying drawings, wherein like numerals indicate the same elements throughout the views.

DETAILED DESCRIPTION OF THE PREFERRED EMBODIMENTS

Figure 1:
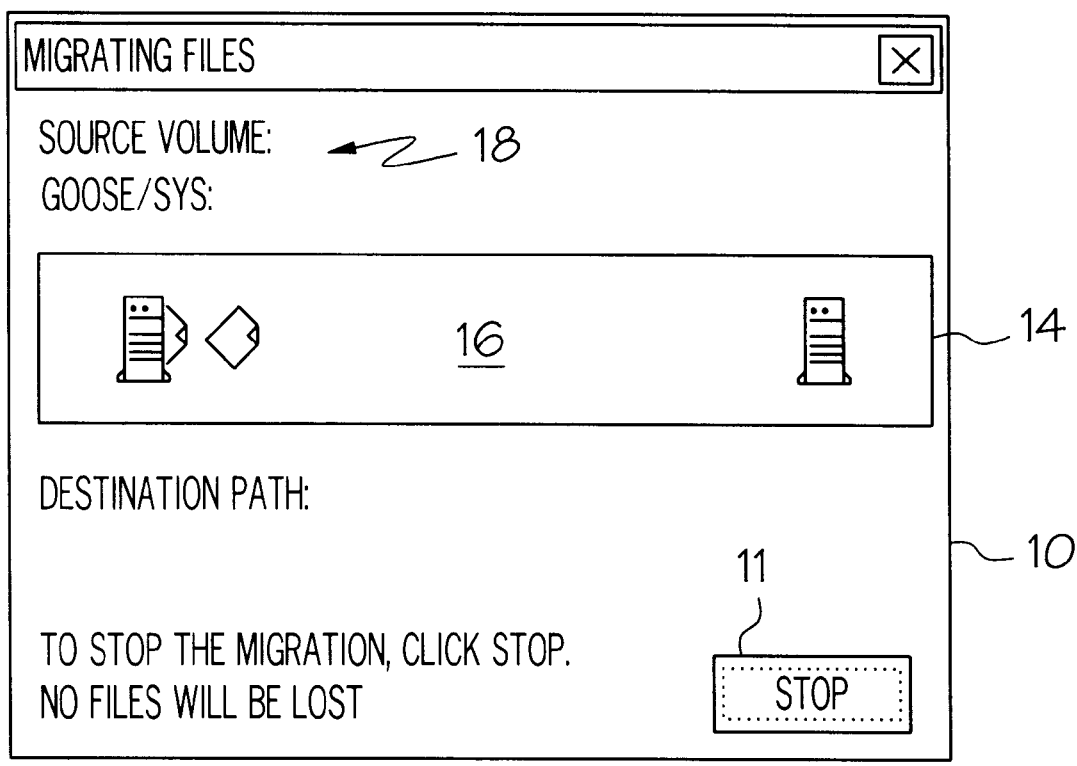
FIG. 1 shows a parent window containing an animation window according to one embodiment of this invention.

Referring now to FIG. 1, animation window 14 is positioned within parent window 10. An animation is displayed within animation window 14. As used herein, the word image refers to a file or other data structure having a format suitable for storing a graphic picture therein, such as BMP, PCX, TIFF, JPEG, ICON, and GIF files, or corresponding memory structures. An animation comprises a plurality of images sequentially displayed at the same location on a display device. Thus, image 16 represents one of several images used to implement the animation occurring within animation window 14. In this example, each image is rectangular, and considerably wider than it is tall. The animation is used to graphically illustrate files being moved from one file server to another file server, and the images used to implement the animation show a document traveling from one file server to another file server. As is often the case, parent window 10 also incudes descriptive text, such as text 18.

One problem with animations arises when software is released in one or more countries which have native languages different from the language in which the original parent window was designed. Before the software can be released in those countries, descriptive text, such as text 18, will typically be translated into the native language of the country in which the software will be released. To ease this translation process, many development environments, such as the Microsoft and Borland C++ development environments, allow textual strings to be located in a file which is external to the program, and which can be manipulated without recompilation of the program. This allows a translator, sometimes referred to as a 'localizer', to edit the external data file, and translate the text from the original language to the native language of that particular country. When the software executes, it uses the translated textual strings from the external data file. This eliminates the need to modify and recompile the program for each country in which the software will be released.

The use of animations, however, can present a problem with this textual translation process. One language can require more words to convey the same idea than in another language. Thus, even though text and animations can be carefully positioned within a parent window when originally designed in one particular language, the positioning may no longer be suitable after the text has been translated into another language. For example, the text represented by element 18 could require significantly more space in another language than it does in English. The translated text may overrun into the area of animation window 14, causing either the translated text to be superimposed on animation window 14, or to be hidden underneath animation window 14, either of which is aesthetically unpleasing. Conventional mechanisms used to resolve this situation require editing the software and positioning animation window 14 elsewhere in parent window 10 to compensate for the additional space required by text 18. This requires the skills to modify and recompile software, as well as the development tools necessary to accomplish this. Localizers may frequently have neither the expertise nor the requisite tools to achieve this.

The method and system of generating an animation according to one embodiment of this invention overcomes this problem by using an animation window whose size and position can be specified external to the program. Thus, if after text 18 has been translated, an animation must be repositioned and/or resized, the localizer need only edit the size and position values of animation window 14, eliminating the need to modify and recompile the program.

According to one preferred embodiment of this invention, an external file such as a resource file is used to store the size and position parameters of animation window 14, which can be edited and which the software will use to position and size animation window 14. This will be described with reference to Table 1, below.

TABLE 1

IDD_PROGRESS DIALOG 261, 64, 237, 136
STYLE DS_MODALFRAME | 0x4L | WS_POPUP | WS_VISIBLE | WS_CAPTION
CAPTION "Migrating Files"
FINT 8, "MS Sans Serif"
{
PUSHBUTTON "&Stop", IDC_STOP, 180, 115, 50, 14
CONTROL "", IBM_ANIMATE, "static", SS_BLACKRECT | WS_CHILD| WS_VISIBLE, 7, 7, 223, 37
LTEXT "To stop the migration, click Stop.\nNo files will be lost.", IDC_PROGRESS_TEXT, 7, 114, 171, 17
LTEXT "Source volume:", −1, 7, 53, 216, 8
LTEXT "Destination path:", IDC_DESTPATHTEXT, 7, 81, 216, 8
LTEXT "", IDC_PROGSOURCE, 7, 63, 223, 12, WS_BORDER | WS_GROUP
LTEXT "", IDC_PROGDEST, 7, 91, 223, 12, WS_BORDER | WS_GROUP
}

The bolded text in Table 1 beginning with the word "CONTROL" illustrates the definition of an animation record in a resource file, according to one embodiment of this invention. The animation record contains data fields separated by commas which are used by the source program to position and size an animation window in a parent window. The second field, which contains the text "IBM_ANIMATE", is the identifier used by the program to identify the animation record at run time. Other fields, such as those containing "SS_BLACKRECT", "WS_CHILD", and "WS_VISIBLE" are used to by a resource editor, such as the Borland Resource Workshop, to define the visual attributes of a rectangle defined by the animation record. The first two numeric data fields, containing a "7," and "7" define the X and Y position, respectively, within the parent window of the upper left hand corner of the animation window. The third and fourth numeric fields, containing a "223" and "37" indicate the width and height of the animation window, respectively. The purpose of the animation record is twofold. It supplies the size and positioning information used by the program to create an animation window, and it defines a black rectangle that a localizer will see when looking at the resource file with a resource editor. Based on the black rectangle shown in the resource editor, the localizer can determine how the rectangle should be moved or resized to accommodate any translated text. The numeric values in the data fields discussed previously are then changed to reflect the new size and location of the rectangle, in necessary, and these values are also used by the program when creating the animation window.

The program implementing the animation uses this information to determine the size and position of the animation window. Software instructions ("code") which extract this information from the resource file and use it to create and position an animation window is shown below in Table 2.

TABLE 2

//Get the dimensions of the animate record defined in the .RC file
rcAnimate = GetDlgControlRect(HWindow, IBM_ANIMATE);
TRect    client (rcAnimate.left,
                rcAnimate.top,
                rcAnimate.right,
                rcAnimate.bottom);
animate->MoveWindow(client);
animate->ShowWindow(SW_SHOWNORMAL);

The code illustrated was prepared with the Borland C++ compiler, release 4.52, however, other development environments contain similar functions that allow a program to extract a record from a resource file, and create and display a window in a parent window.

The method according to this invention then displays each image associated with the animation within the animation window. According to another embodiment of this invention, the images themselves are also entries in the resource file, and thus can be independently enlarged or decreased in size, as necessary, to fit a resized animation window.

Complexity is another problem with generating an animation. An animation involves loading images into an array, invoking functions to convert the images into an appropriate internal format for display, setting interrupts to generate events at predetermined intervals, responding to the interrupts and preparing the appropriate image to display next, and displaying the image at the appropriate location. Many of the functions which are invoked to load and display images differ depending upon the type of image used. Thus, an animator must always be aware of the type of image being used in an animation and ensure that the appropriate functions are called. Further, because animations are typically used in event-driven windowing environments, the various code segments to perform an animation are typically dispersed throughout the code. This lack of code modularity increases the complexity of an animation, as well as the debugging frequently required.

The method and system according to one embodiment of this invention implement an object-oriented approach to animation which modularizes and greatly simplifies implementing an animation. An animation object instantiated from the animation class is provided containing the methods required to perform image loading, image display, animation location, setting up the appropriate timer events and responding to the events, as well as pausing and resuming the animation. The animation class according to this invention also includes the ability to pause an animation on a particular animation image.

The animation class according to this invention also relieves the developer from the intricacies involved in invoking different functions depending upon the type of image that is being used to generate the animation. The animation class need only know what type of image is being used, and it will select the appropriate structure types, loading functions, and displaying functions appropriate for that type of image. Thus, developers that have no knowledge of the intricacies of animations can easily implement animations in their software.

Figure 2:
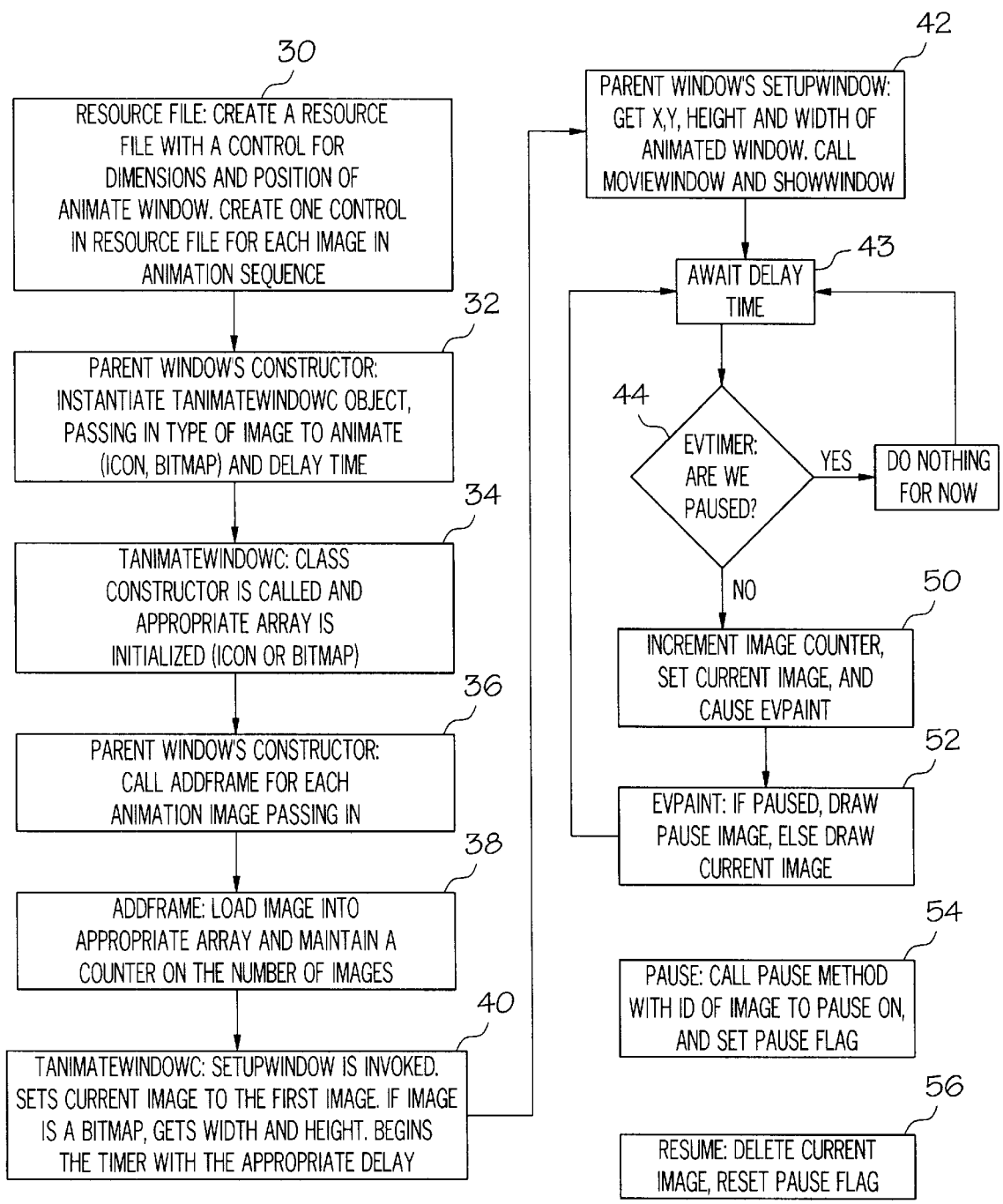
FIG. 2 is a flow diagram illustrating a method for generating an animation according to one embodiment of this invention.

Referring now to FIG. 2, the use of the animation class according to one embodiment of this invention will be described. At block 30, an animation window control, as described above with respect to Table 1, is created which contains the dimensions and position within a parent window of the animation window. A control is also created for each image which will be used in the animation. Table 3, below, shows an example of the controls used to implement an animation comprising six graphic images.

TABLE 3

| IBM_VRFY1 BITMAP | "vrfy1.bmp" |
|---|---|
| IBM_VRFY2 BITMAP | "vrfy2.bmp" |
| IBM_VRFY3 BITMAP | "vrfy3.bmp" |
| IBM_VRFY4 BITMAP | "vrfy4.bmp" |
| IBM_VRFY5 BITMAP | "vrfy5.bmp" |
| IBM_VRFY6 BITMAP | "vrfy6.bmp" |

At block 32, an instance of the animation class is created in the constructor method of the parent window within which the animation will occur. This can be achieved with the following code:

```
animate=new TAnimateWindowC (this, ANIM_BITMAP, 50,
    FALSE,NULL,RES)
```

During the instantiation of the animation object, which, in this example is entitled 'animate,' parameters are included which define the type of animation desired. For example, the type of image, either icon or bitmap, to use in the animation, as well as the delay which should be used in the timer interrupt routine are both passed in to the animation class during the instantiation of the animate object.

At block 34, when the animate object is instantiated, the constructor of the TAnimateWindowC class is invoked by the operating system, and the appropriate variables, depending on the type of image used to implement the animation, are initialized. The following code can be used to implement the TAnimateWindowC class constructor.

```
TAnimateWindowC::TAnimateWindowC (TWindow* parent, int type,
    int background, int delay, const char far* title, TModule* module)
    :TWindow(parent, title, module),
    nDelay(delay),
    type(type),
    fPaintBack(background),
    res(module)
{
Animation Window Initialization
The following class values get initialized as the animation window is first
created:
    nFrameWidth   =0;      //width of each animation frame
    nFrameHeight  =0;      //height of each animation frame
    timer         =0;      //flag indicating that a timer is
                            going
    nTotalFrames  =0;      //total number of frames to
                            animate
    nIndex        =0;      //the index of the current frame
    bCurrentFrame =NULL;   //the bitmap of the current frame
    iCurrentFrame =NULL;   //the icon of the current frame
    bStillFrame   =NULL;   //a bitmap frame that's frozen
```

-continued

```
    iStillFrame   =NULL;   //an icon frame that's frozen
    fPause        =FALSE;  //pause flag
    nTimer        =0;      //the timer ID
    fPaintBack    =FALSE;  //flag to paint background
//Initialize the icon or bitmap array
for (int i=0; i < MAX_FRAMES; i++)
{
    if (type == ANIM_BITMAP)
    {
        bFrame[i] = NULL;
    }
    else
    {
        iFrame[i] = NULL;
    }
}
SetBkgndColor(::GetSysColor(COLOR_BTNFACE));
}
```

The TAnimateWindowC class includes an AddFrame method which is invoked once for each image in the animation sequence. At block 36, the AddFrame method is invoked in the constructor of the parent window. An example of these calls are provided below.

animate → AddFrame (IBM_VRFY1);
animate → AddFrame (IBM_VRFY2);
animate → AddFrame (IBM_VRFY3);
animate → AddFrame (IBM_VRFY4);
animate → AddFrame (IBM_VRFY5);
animate → AddFrame (IBM_VRFY6);
animate → AddFrame (IBM_VRFY7);
animate → AddFrame (IBM_VRFY8);

The AddFrame method can comprise the following lines of code:

```
Add Bitmap or Icon to the Animation Sequence
nint TAnimateWindowC::AddFrame(int resID)
{
    HINSTANCE hInst;
    hInst = res->GetInstance();
    if (timer > 0) //Once the animation has started, no adding
    {
        return FALSE;
    }
    if (nTotalFrames >= MAX_FRAMES)
    {
        //Can't add anymore frames, "maxxed" out the array
        return FALSE;
    }
    if (type == ANIM_BITMAP)
    {
        bFrame[nTotalFrames] = new TBitmap(hInst, resID);
        if(bFrame[nTotalFrames] != NULL)
        {
            nTotalFrames++; //Frame successfully added
        }
    }
    else
    {
        iFrame[nTotalFrames] = new TIcon(hInst, resID);
        if(iFrame[nTotalFrames] != NULL)
        {
            nTotalFrames++;   //Frame successfully added
        }
    }
    return TRUE;
}
```

At block 38, the AddFrame method calls the appropriate functions to extract the image from the resource file, depending upon whether the image is a bitmap or an icon, and loads an appropriate array type with the images. Although some of the code shown is specific with respect to the Borland development environment, similar calls and functionality exist in other development environments.

At block 40, the operating system invokes the SetupWindow method of the animate object. The SetupWindow method determines if any images have been loaded through the AddFrame method, determines the width and height of the images used, and sets the timer with the requested timer delay. The code used to implement the SetupWindow method of the animate object is presented below:

```
Setup Animation Frames
void TAnimateWindowC::SetupWindow()
{
  int    fOkay = TRUE;
  TWindow::SetupWindow();
  //See if we have any frames registered
  if (nTotalFrames > 0)
  {
    //Check all of the registered frames
    for (nint i=0; i < nTotalFrames; i++)
    {
      if (type == ANIM_BITMAP)
      {
        if(bFrame[i]==FALSE)
        {
          fOkay = FALSE;
        }
      }
      else
      {
        if(iFrame[i])==FALSE)
        {
          fOkay = FALSE;
        }
      }
    }
    if (fOkay == TRUE)
    {
      if (type == ANIM_BITMAP) // If a bitmap, get the dimensions
      {
        //Set the first frame to current
        bCurrent Frame = bFrame[0]; frame
        //Only calculate width and height once
        //(They must all be the same width and height.)
        nFrameWidth = bCurrentFrame->Width();
        nFrameHeight = bCurrentFrame->Height();
      }
      else
      {
        //Set the first frame to current
        iCurrentFrame = iFrame[0]; frame
      }
      SetTimer(ANIMATE_TIMER, nDelay);
      nTimer = ANIMATE_TIMER;
    }
  }
  SetBkgndColor(::GetSysColor(COLOR_BTNFACE));
  return;
}
```

At block 42, the SetupWindow method of the parent window within which the animation window is positioned is invoked, the dimensions of the position and size of the animation window are obtained, and the system functions necessary to display the animation window are invoked, as set forth below.

```
rcAnimate = GetDlgControlRect(HWindow, IBM_ANIMATE);
TRect    client (rcAnimate.left,
                 rcAnimate.top,
                 rcAnimate.right,
                 rcAnimate.bottom);
animate->MoveWindow(client);
animate->ShowWindow(SW_SHOWNORMAL);
```

At this point the animation begins, and at block 43, after the appropriate delay time, the timer event occurs which causes the EvTimer method of the animate object to be invoked. The EvTimer method is set forth below:

```
Cause the Bitmap or Icon to be Drawn
This will cycle to the next bitmap or icon and force a repaint.
void TAnimateWindowC::EvTimer(uint)
{
  if (nTotalFrames > 0)
  {
    //The pause flag can be toggled by the Pause() and
    //Resume() functions. The default is FALSE.
    if (fPause == FALSE)
    {
      //Restart the loop when we reach the last frame
      if (nIndex >= (nTotalFrames - 1))
      {
        nIndex = 0;
      }
      else
      {
        nIndex++;
      }
      if (type == ANIM_BITMAP)
      {
        bCurrentFrame = bFrame[nIndex];
      }
      else
      {
        iCurrentFrame = iFrame[nIndex];
      }
      // Force a repaint of the window
      Invalidate(fPaintBack);
    }
  }
}
```

The EvTimer method determines whether the animation has been paused, and if not, at block 50, loads the current frame variable with the next appropriate image in the animation sequence. The EvTimer method maintains an index into the array containing the images to ensure that the animation is presented in the proper sequence. The EvTimer method then forces a repaint of the animation window. At block 52, the EvPaint method is invoked to paint the animation window. The EvPaint method is set forth below:

```
Respond to Paint Messages
Every time the timer goes off, the TAnimateWindowC will be
forced to repaint -- creating this message. Then, BitBlt draws
the new bitmap after it is selected into memory.
void TAnimateWindowC::EvPaint()
{
  TpaintD  paintDC(HWindow);
  if (type == ANIM_BITMAP)
  {
    TMemoryDC memDC(paintDC);
    if (bStillFrame != NULL)
    {
      memDC.SelectObject(*bStillFrame);
```

-continued

```
        }
        else
        {
                memDC.SelectObject(*bCurrentFrame);
        }
        paintDC.BitBlt(0,          //Destination X
                    0,             //DestinationY
                    nFrameWidth,   //Destination width
                    nFrameHeight,  //Destination height
                    memDC,         // Memory  device context(bitmap)
                    0,             //Source X
                    0,             //Source Y
                    SRCCOPY);      //Copy source directly to dest.
    }
    else
    {
        if (iStillFrame != NULL)
        {
            paintDC.DrawIcon(0, 0, *iStillFrame);
        }
        else
        {
            paintDC.DrawIcon(0, 0, *iCurrentFrame);
        }
    }
    return;
}
```

The EvPaint method determines the type of image used to implement the animation and calls the appropriate system functions to draw the image in the animation window.

Block 54 of FIG. 2 illustrates pausing the animation. In order to pause the animation, the Pause method is invoked. The Pause method is set forth below:

```
void TAnimateWindowC::Pause(int resID)
{
    HINSTANCE hInst;
    fPause = TRUE;
    hInst = res->GetInstance();
    if (resID > 0)
    {
        if (type == ANIM_BITMAP)
        {
            bStillFrame = new TBitmap(hInst, resID);
        }
        else
        {
            iStillFrame = new TIcon(hInst, resID);
        }
        Invalidate(TRUE); //This forces a repaint of the window
        UpdateWindow();
    }
}
```

The Pause method accepts an identifier of the image which should be displayed in the animation window during the pause. The Pause method sets a flag indicating a pause situation and loads the specified image into a pause image variable suitable for the type of image used in the animation. The Pause method then forces a repaint of the window. When the Paint method is invoked it determines whether the Pause flag is set, and if it is, calls the appropriate system function to display the image specified in the pause image variable.

Block 56 represents a resume of the animation. In order to resume the animation, the Resume method of the animate object is invoked. The Resume method is set forth below:

```
Resume a Pause Animation
void TAnimateWindowC::Resume()
{
    fPause = FALSE;
    if (type == ANIM_BITMAP)
    {
        if (bStillFrame != NULL)
        {
            delete bStillFrame;
            bStillFrame = NULL;
        }
    }
    else
    {
        if (iStillFrame != NULL)
        {
            delete iStillFrame;
            iStillFrame = NULL;
        }
    }
    Invalidate(TRUE); //This forces a repaint of the window
}
```

The Resume method sets the appropriate pause image variable to null, resets the pause flag, and forces a repaint of the window, which causes the animation to continue.

The animation class disclosed herein modularizes animations, and greatly simplifies the effort required to perform an animation. With the exception of a few lines of code placed in the constructor method of the parent window in which the animation will occur all the code responsible for performing, controlling and otherwise regulating the animation is self-contained in a simple-to-use animation object.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A process for designating a location in a parent window of an animation, comprising:

generating an animation window within which the animation will be displayed;

reading positioning information indicating a position of said animation window within said parent window;

setting the location of said animation window within said parent window as a finction of said positioning information;

loading a plurality of images into a first memory; and displaying said images in said animation window.

2. A process according to claim 1, wherein said positioning information comprises an x-coordinate and a y-coordinate within the parent window at which said animation window should be displayed.

3. A process according to claim 1, further comprising reading sizing information indicating a size of said animation window, and resizing said animation window according to said sizing information before displaying said images in said animation window.

4. A process according to claim 3, wherein said sizing information comprises a height value and a width value.

5. A process according to claim 1, further comprising receiving an image-type indicator identifying a type of image, and wherein the loading step comprises invoking a finction for storing said images in said first memory, and passing a reference to the image and an image-type indicator to said function.

6. A process according to claim 5, wherein said image-type indicator is one of an icon indicator and a bitmap indicator.

7. A process according to claim 1, further comprising pausing the animation in response to a user request, wherein the animation is paused on a predetermined one of said images.

8. A process according to claim 1, wherein said plurality of graphic images have a preferred display sequence, and said images are loaded into the first memory in said preferred display sequence.

9. An object-oriented animation for implementation in a computer, comprising:

(a) an animation object, said animation object including an animation window;

(b) a first method for receiving a plurality of images operative to be displayed in said animation window, said method storing said plurality of images in a memory structure in a preferred animation sequence;

(c) a sequence counter for maintaining said preferred animation sequence; and (d) a timer method for responding to a timer interrupt and causing said next image to be displayed in said animation window.

10. An object-oriented animation according to claim 9, further comprising a pause method for placing said animation in a pause state.

11. An object-oriented animation according to claim 10, wherein said pause method receives a reference to one of said plurality of images, and is operative to cause said image to be displayed in said animation window while said animation is in said pause state.

12. An object-oriented animation according to claim 10, further comprising a resume method operative to resume said animation from said pause state.

13. An object-oriented animation according to claim 9, further comprising an external data structure, said external data structure containing positioning data for said animation window, and said animation object positioning said animation window within a parent window as a function of said positioning data.

14. An object-oriented animation according to claim 9, further comprising an external data structure, said external data structure containing sizing data for said animation window, and said animation object sizing said animation window as a function of said sizing data.

15. An object-oriented animation according to claim 9, further comprising an animation constructor method which receives an image identifier of a type of image to be used to implement said animation, and said first method loads said images into a particular type of memory structure as a function of said image identifier.

16. An object-oriented animation according to claim 15, further comprising a paint method, said paint method being invoked to display said next image, and said paint method calling a particular system routine to display said animation as a function of said image identifier.

17. A computer readable medium containing software instructions operative to designate a location in a parent window of an animation by performing the steps of:

generating an animation window within which the animation will be displayed;

reading positioning information indicating a position of said animation window within said parent window;

setting the location of said animation window within said parent window as a function of said positioning information;

loading a plurality of images into a first memory; and displaying said images in said animation window.

18. A process according to claim 1, wherein the animation displayed within said animation window comprises a plurality of sequentially displayed graphical objects.

19. A process according to claim 18, wherein each said graphical object comprises an image.

20. A process according to claim 19, wherein each said image is one of an icon and a bitmap.

* * * * *

UNITED STATES PATENT AND TRADEMARK OFFICE
CERTIFICATE OF CORRECTION

PATENT NO. : 5,946,002
DATED : August 31, 1999
INVENTOR(S) : Lee E. Lowry

It is certified that error appears in the above-identified patent and that said Letters Patent is hereby corrected as shown below:

Claim 1, column 12, line 56, change "finction" to --function--.

Claim 5, column 13, line 9, change "finction" to --function--.

Signed and Sealed this

Fourteenth Day of March, 2000

*Attest:*

Q. TODD DICKINSON

*Attesting Officer*    *Commissioner of Patents and Trademarks*